United States Patent [19]
Lewchuk et al.

[11] Patent Number: 6,058,461
[45] Date of Patent: May 2, 2000

[54] COMPUTER SYSTEM INCLUDING PRIORITIES FOR MEMORY OPERATIONS AND ALLOWING A HIGHER PRIORITY MEMORY OPERATION TO INTERRUPT A LOWER PRIORITY MEMORY OPERATION

[75] Inventors: W. Kurt Lewchuk, Austin; Brian D. McMinn, Buda; James K. Pickett, Austin, all of Tex.

[73] Assignee: Advanced Micro Devices, Inc., Sunnyvale, Calif.

[21] Appl. No.: 08/982,588

[22] Filed: Dec. 2, 1997

[51] Int. Cl.[7] .................................................. G06F 13/18
[52] U.S. Cl. ......................... 711/158; 711/137; 711/151
[58] Field of Search ....................... 711/151, 158, 711/137; 709/240; 710/113, 114, 119, 120, 121, 40, 240, 241, 242, 243, 244, 264; 712/207

[56] References Cited

U.S. PATENT DOCUMENTS

| | | | |
|---|---|---|---|
| 4,729,093 | 3/1988 | Mothersole et al. | 712/207 |
| 4,755,933 | 7/1988 | Teshima et al. | 711/157 |
| 5,367,657 | 11/1994 | Khare et al. | 712/207 |
| 5,619,663 | 4/1997 | Mizrahi-Shalom et al. | 711/137 |
| 5,673,415 | 9/1997 | Nguyen et al. | 711/151 |
| 5,721,865 | 2/1998 | Shintani et al. | 712/207 |

OTHER PUBLICATIONS

Tullsen et al., Exploiting Choice:Instruction Fetch and Issue on an Implementable Simultaneous Mutithreading Processor Proceedings of the 23rd Annual International Symposium on Computer Architecture, Philadelphia, PA, May 1996, pp. 191–202 [Online] http://www.cs.washington.edu/research/smt.

*Primary Examiner*—Eddie P. Chan
*Assistant Examiner*—Yamir Encarnacion
*Attorney, Agent, or Firm*—Conley, Rose & Tayon, P.C.; Lawrence J. Merkel

[57] ABSTRACT

A computer system includes one or more microprocessors. The microprocessors assign a priority level to each memory operation as the memory operations are initiated. In one embodiment, the priority levels employed by the microprocessors include a fetch priority level and a prefetch priority level. The fetch priority level is higher priority than the prefetch priority level, and is assigned to memory operations which are the direct result of executing an instruction. The prefetch priority level is assigned to memory operations which are generated according to a prefetch algorithm implemented by the microprocessor. As memory operations are routed through the computer system to main memory and corresponding data transmitted, the elements involved in performing the memory operations are configured to interrupt the transfer of data for the lower priority memory operation in order to perform the data transfer for the higher priority memory operation. While one embodiment of the computer system employs at least a fetch priority and a prefetch priority, the concept of applying priority levels to various memory operations and interrupting data transfers of lower priority memory operations to higher priority memory operations may be extended to other types of memory operations, even if prefetching is not employed within a computer system. For example, speculative memory operations may be prioritized lower than non-speculative memory operations throughout the computer system.

17 Claims, 4 Drawing Sheets

COMPUTER SYSTEM INCLUDING PRIORITIES FOR MEMORY OPERATIONS AND ALLOWING A HIGHER PRIORITY MEMORY OPERATION TO INTERRUPT A LOWER PRIORITY MEMORY OPERATION

BACKGROUND OF THE INVENTION

1. Field of the Invention

This invention is related to the field of computer systems and, more particularly, to memory latency issues within computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the effective memory latency. Cache misses require the access to receive data from the main memory, thereby increasing the effective memory latency.

In order to increase cache hit rates, computer systems may employ prefetching to "guess" which data will be requested by the microprocessor in the future. The term prefetch, as used herein, refers to transferring data (e.g. a cache line) into a cache prior to a request for the data being received by the cache in direct response to executing an instruction (either speculatively or non-speculatively). A request is in direct response to executing the instruction if the definition of the instruction according to the instruction set architecture employed by the microprocessor includes the request for the data. A "cache line" is a contiguous block of data which is the smallest unit for which a cache allocates and deallocates storage. If the prefetched data is later accessed by the microprocessor, then the cache hit rate may be increased due to transferring the prefetched data into the cache before the data is requested.

Unfortunately, prefetching can consume memory bandwidth at an inopportune time with respect to the occurrence of non-speculative memory operations. For example, a prefetch memory operation may be initiated just slightly prior to the initiation of a non-prefetch memory operation. As the prefetch memory operation is occupying the memory system already, the latency of the non-prefetch memory operation is increased by the amount of time the memory system is occupied with the prefetch request. Particularly if the prefetch is incorrect (i.e. the prefetched data is not used later by the requester), the increased latency may decrease performance of the microprocessor (and the overall computer system).

SUMMARY OF THE INVENTION

The problems outlined above are in large part solved by a computer system in accordance with the present invention. The computer system includes one or more microprocessors. The microprocessors assign a priority level to each memory operation as the memory operations are initiated. In one embodiment, the priority levels employed by the microprocessors include a fetch priority level and a prefetch priority level. The fetch priority level is higher priority than the prefetch priority level, and is assigned to memory operations which are the direct result of executing an instruction. The prefetch priority level is assigned to memory operations which are generated according to a prefetch algorithm implemented by the microprocessor. As memory operations are routed through the computer system to main memory and corresponding data transmitted, the elements involved in performing the memory operations are configured to interrupt the transfer of data for the lower priority memory operation in order to perform the data transfer for the higher priority memory operation.

Advantageously, even though memory bandwidth is consumed by the prefetch memory operations, the latency experienced by the fetch memory operations may not be significantly impacted due to the interrupting of the prefetch memory operations to perform the fetch memory operations. Performance of the computer system may be increased due to the lack of impact on the latency of the fetch memory operations by the prefetch memory operations. Furthermore, more aggressive prefetch algorithms (e.g. algorithms which generate more prefetch memory operations) may be employed because the concerns regarding increasing the memory latency of non-prefetch memory operations because of interference by the prefetch memory operations is substantially allayed. The more aggressive prefetch algorithms may lead to increased prefetch effectiveness, further decreasing overall effective memory latency. Performance of the microprocessors employing the more aggressive prefetch algorithms may thereby by increased, and overall performance of the computer system may accordingly be improved.

While one embodiment of the computer system employs at least a fetch priority and a prefetch priority, the concept of applying priority levels to various memory operations and interrupting data transfers of lower priority memory operations to higher priority memory operations may be extended to other types of memory operations, even if prefetching is not employed within the computer system. For example, speculative memory operations may be prioritized lower than non-speculative memory operations throughout the computer system. Performance of the computer system may thereby be increased.

Broadly speaking, the present invention contemplates a method for transferring data in a computer system. A first memory operation having a first priority is initiated. Subsequently, a second memory operation having a second priority is initiated. At least a portion of data corresponding to the first memory operation is transferred. The transferring is interrupted if the second priority is higher than the first priority, and data corresponding to the second memory operation is transferred during the interruption.

The present invention further contemplates a computer system comprising at least one microprocessor, a main memory, and a bus bridge. The microprocessor is configured to initiate a first memory operation and to subsequently initiate a second memory operation. Additionally, the microprocessor is configured to assign a first priority to the first memory operation responsive to a first type of the first memory operation, and to assign a second priority to the second memory operation responsive to a second type of the second memory operation. The main memory is configured to store data including first data corresponding to the first memory operation and second data corresponding to the second memory operation. Coupled between the microprocessor and the main memory, the bus bridge is configured to initiate transfer of the first data from the main memory to the microprocessor responsive to the first memory operation. Furthermore, the bus bridge is configured to interrupt transfer of the first data upon receiving the second memory operation if the second priority is higher than the first priority.

Moreover, the present invention contemplates a bus bridge for a computer system, comprising a CPU interface block and a memory controller. The CPU interface block is coupled to receive bus operations from a microprocessor. The bus operations include memory operations, and each memory operation includes a priority assigned by an initiator of the memory operation. Coupled to the CPU interface block and a memory, the memory controller is configured to receive each memory operation and the priority from the CPU interface block. The memory controller is configured to interrupt an in-progress memory operation to service a subsequent memory operation if a first priority corresponding to the in-progress memory operation is lower than a second priority corresponding to the subsequent memory operation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
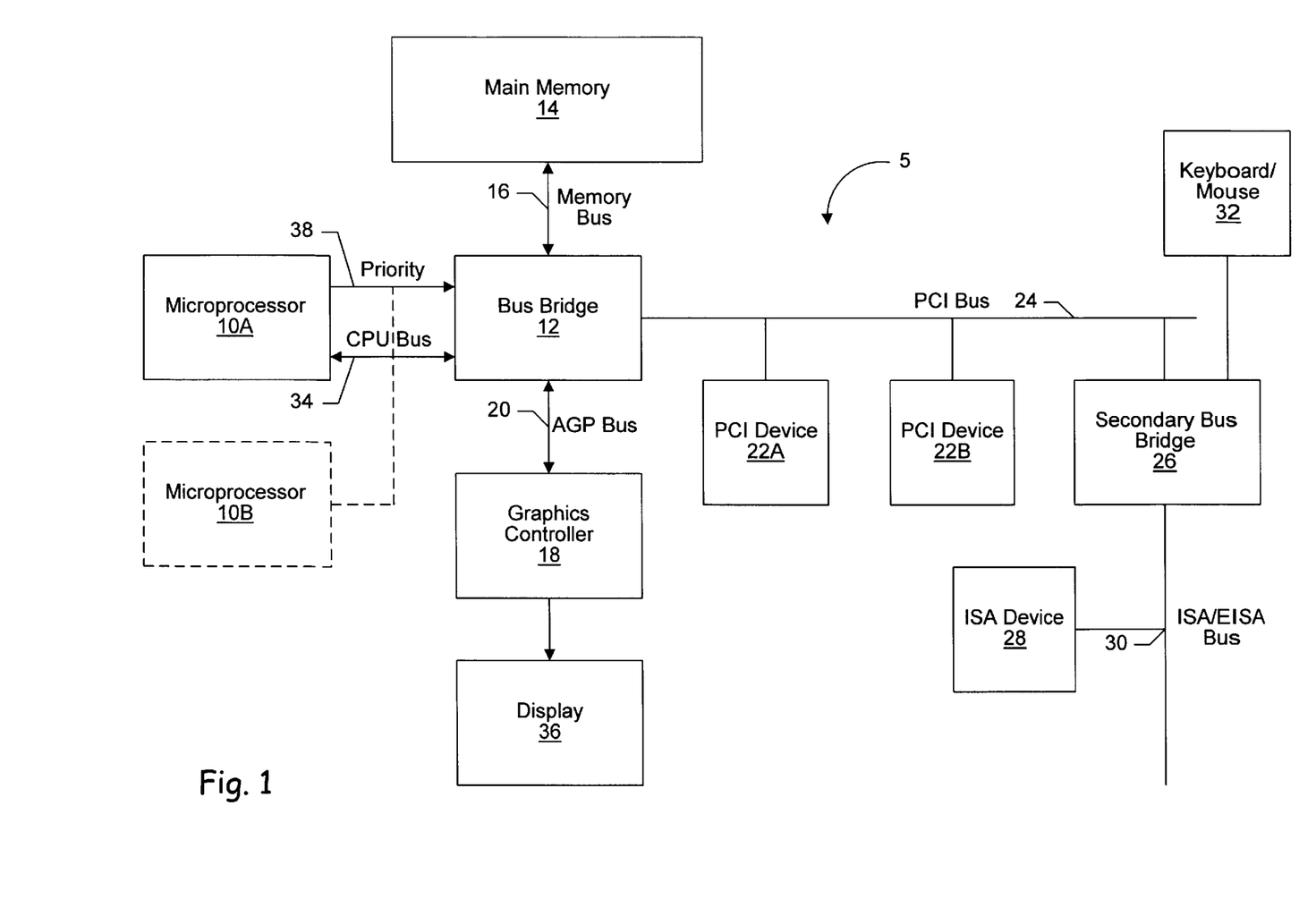
FIG. 1 is a block diagram of one embodiment of a computer system.

Turning now to FIG. 1, a block diagram of one embodiment of a computer system including one or more microprocessors (e.g. microprocessors 10A and 10B shown in FIG. 1) coupled to a variety of system components through a bus bridge 12 is shown. Other embodiments are possible and contemplated. In the depicted system, a main memory 14 is coupled to bus bridge 12 through a memory bus 16, and a graphics controller 18 is coupled to bus bridge 12 through an AGP bus 20. Finally, a plurality of PCI devices 22A–22B are coupled to bus bridge 12 through a PCI bus 24. A secondary bus bridge 26 may further be provided to accommodate an electrical interface to one or more EISA or ISA devices 28 through an EISA/ISA bus 30. Microprocessors 10A and 10B are coupled to bus bridge 12 through a CPU bus 34 and a priority line 38. Alternatively, independent buses may be coupled between bus bridge 12 and each of microprocessors 10A and 10B. As illustrated by the dotted illustration of microprocessor 10B, embodiments of computer system 5 employing only one microprocessor are contemplated. Additionally, embodiments employing more than two microprocessors are contemplated.

Generally speaking, microprocessors 10A and 10B are configured to initiate memory operations upon CPU bus 34 in order to transfer data to and from main memory 14. Microprocessors 10A and 10B assign a priority to each memory operation, and transmit that priority concurrently with initiation of the memory operation. The assigned priority is transmitted via priority line 38. In one embodiment, at least two priority levels are defined: a fetch priority level and a prefetch priority level. The fetch priority level is assigned to memory operations which are the direct result of executing an instruction. These memory operations may be either read memory operations or write memory operations. The prefetch priority level is assigned to prefetch memory operations generated in accordance with the prefetch algorithm employed by microprocessors 10A and 10B. Prefetch memory operations may be read memory operations. It is noted that microprocessors 10A and 10B may employ any suitable prefetch algorithm. A variety of well-known prefetch algorithms may be used, for example.

Bus bridge 12 receives the memory operations initiated by microprocessors 10A and 10B, and transfers the data to/from main memory 14 via memory bus 16. The data is returned to the microprocessor 10A or 10B (if the data is a read memory operations) via CPU bus 34. Data is transferred to bus bridge 12 via CPU bus 34 for a write memory operation, and the data is subsequently transmitted to main memory 14 via memory bus 16.

If bus bridge 12 is in the process of performing a data transfer for a memory operation to main memory 14 and the memory operation is assigned a prefetch priority level, the read memory operation may be interrupted to perform a data transfer for another memory operation which is assigned a fetch priority level. Advantageously, prefetch memory operations (which are assigned the prefetch priority level) do not interfere with access to memory for fetch memory operations (i.e. memory operations assigned the fetch priority level). The fetch memory operations may be completed with a latency similar to the latency that is experienced in the absence of prefetch memory operations. Even though the prefetch memory operations consume memory system bandwidth, they may not substantially increase the memory latency of the fetch memory operations. Performance of the microprocessors 10A and 10B (and overall performance of the computer system) may be increased by the lack of increase in the memory latency for fetch operations due to the occurrence of prefetch memory operations. Furthermore, the interruption of prefetch memory operations to perform higher priority fetch memory operations may allow for more aggressive prefetch algorithms to be employed within microprocessors 10A and 10B. Since the latency of fetch memory operations is substantially unaffected by the prefetch memory operations, more aggressive prefetching may be permissible.

Subsequent to transferring data in response to the fetch memory operation, bus bridge 12 is configured to resume transferring data for the interrupted, lower priority memory operation. The lower priority memory operation is thereby completed. It is noted that the interruption of the transfer of data may occur upon memory bus 16 or upon CPU bus 34, depending upon the embodiment. For example, if CPU bus 34 employs tagging to identify the address transfer of a memory operation with the corresponding data transfer, the tag may be conveyed with each data transfer on CPU bus 34. To interrupt a lower priority data transfer to perform a higher priority data transfer, the tag of the higher priority data transfer is conveyed. Subsequently, the tag of the lower priority data transfer is conveyed to complete the data transfer of the lower priority memory operation.

In one embodiment, bus bridge 12 is configured to interrupt a data transfer to main memory 14 if the lower priority, in-progress memory operation and the higher priority memory operation are within the same "page". As used herein, a "page" refers to a block of data stored within the same row of the DRAMs which comprise main memory 14. The row is accessed via a row address provided by bus bridge 12, and then the column address of the particular datum being addressed is provided (typically using the same address lines used to provide the row address). Additionally data within the row can be accessed by providing another column address without providing the row address again (referred to as a "page hit"). Reading or writing additional data from the same row in this manner (referred to as "page mode") may allow for lower latency access to the data, since the row address need not be provided in between each column access.

By interrupting a lower priority memory operation to perform a higher priority memory operation in the same page only, the higher priority memory operation may be performed quickly (e.g. with a page hit timing). If a different page were accessed, then the current page would be deactivated and the new page accessed by providing the row address of the higher priority memory operation, then the corresponding column addresses. Subsequently, the new page would be deactivated and the page corresponding to the lower priority memory operation re-established. The time spent deactivating and activating pages may outweigh the latency savings for the higher priority memory operation.

While the present disclosure may refer to the prefetch priority level and the fetch priority level for memory operations (with the fetch priority level being a higher priority than the prefetch priority level), it is contemplated that other priority levels may be assigned for other purposes in other embodiments. Furthermore, even if prefetching is not employed, the assignment of priority levels to different types of memory operations may be advantageous. For example, speculative memory operations (performed due to the execution of speculative instructions) might be assigned a lower priority level than non-speculative memory operations (performed due to the execution of non-speculative instructions). In this manner, speculative memory operations could be interrupted to perform non-speculative memory operations. Since the non-speculative memory operations have been confirmed as being required according to the execution of the program and the speculative memory operations may or may not be required, it may be advantageous to interrupt the speculative memory operations to decrease the latency of the non-speculative memory operations. As another example, write back operations to update memory with updates made to a cache line within the cache of a microprocessor may be assigned a lower priority than memory operations to fill a cache line within the cache.

As used herein, a "memory operation" is a transfer of data between an initiator and a memory (or a master and a slave, respectively). A "read memory operation" is a transfer of data from the slave (i.e. the memory) to the master. For example, microprocessor 10A or 10B may initiate a read memory operation to transfer data from main memory 14 to the microprocessor. A "write memory operation" is a transfer of data from the master to the slave (i.e. the memory). For example, microprocessor 10A or 10B may initiate a write memory operation to transfer data from the microprocessor to main memory 14. Memory operations may be of different sizes. However, memory operations to transfer data to and from the cache (e.g. prefetch memory operations and many fetch memory operations) may be performed using a cache line size. Generally, several transfer cycles (or "beats") on both memory bus 16 and CPU bus 34 are used to transfer a cache line of data. For example, four beats is a typical number to transfer a cache line. Interrupting a memory operation to perform a higher priority memory operation may comprise inserting the beats for the higher priority memory operation between two of the beats for the lower priority memory operation. To "initiate" a memory operation, at least the address of the memory operation is conveyed to the slave. Additional control information (including, e.g. the priority level and the read/write nature of the memory operation) may be conveyed concurrent with the memory operation or using a predefined protocol with respect to conveyance of the address. More than one bus clock cycle may comprise initiating a memory operation, depending upon the protocol of CPU bus 34. Data may be conveyed at a time subsequent to initiation of the memory operation.

In addition to the above described functionality, bus bridge 12 generally provides an interface between microprocessors 10A and 10B, main memory 14, graphics controller 18, and devices attached to PCI bus 24. When an operation is received from one of the devices connected to bus bridge 12, bus bridge 12 identifies the target of the operation (e.g. a particular device or, in the case of PCI bus 24, that the target is on PCI bus 24). Bus bridge 12 routes the operation to the targeted device. Bus bridge 12 generally translates an operation from the protocol used by the source device or bus to the protocol used by the target device or bus and routes the operation appropriately. Bus bridge 12 may further be responsible for coherency activity to ensure a proper result for the operation, etc.

In addition to providing an interface to an ISA/EISA bus from PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired. An external cache unit (not shown) may further be coupled to CPU bus 34 between microprocessors 10A and 10B and bus bridge 12 in other embodiments. Alternatively, the external cache may be coupled to bus bridge 12 and cache control logic for the external cache may be integrated into bus bridge 12.

Main memory 14 is a memory in which application programs are stored and from which microprocessors 10A and 10B primarily execute. A suitable main memory 14 comprises DRAM (Dynamic Random Access Memory), SDRAM (Synchronous DRAM), or RDRAM (RAMBUS DRAM).

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14. Graphics controller 18 may therefore be a master of AGP bus 20 in that it can request and receive access to a target interface within bus bridge 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of bus bridge 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

Figure 2:
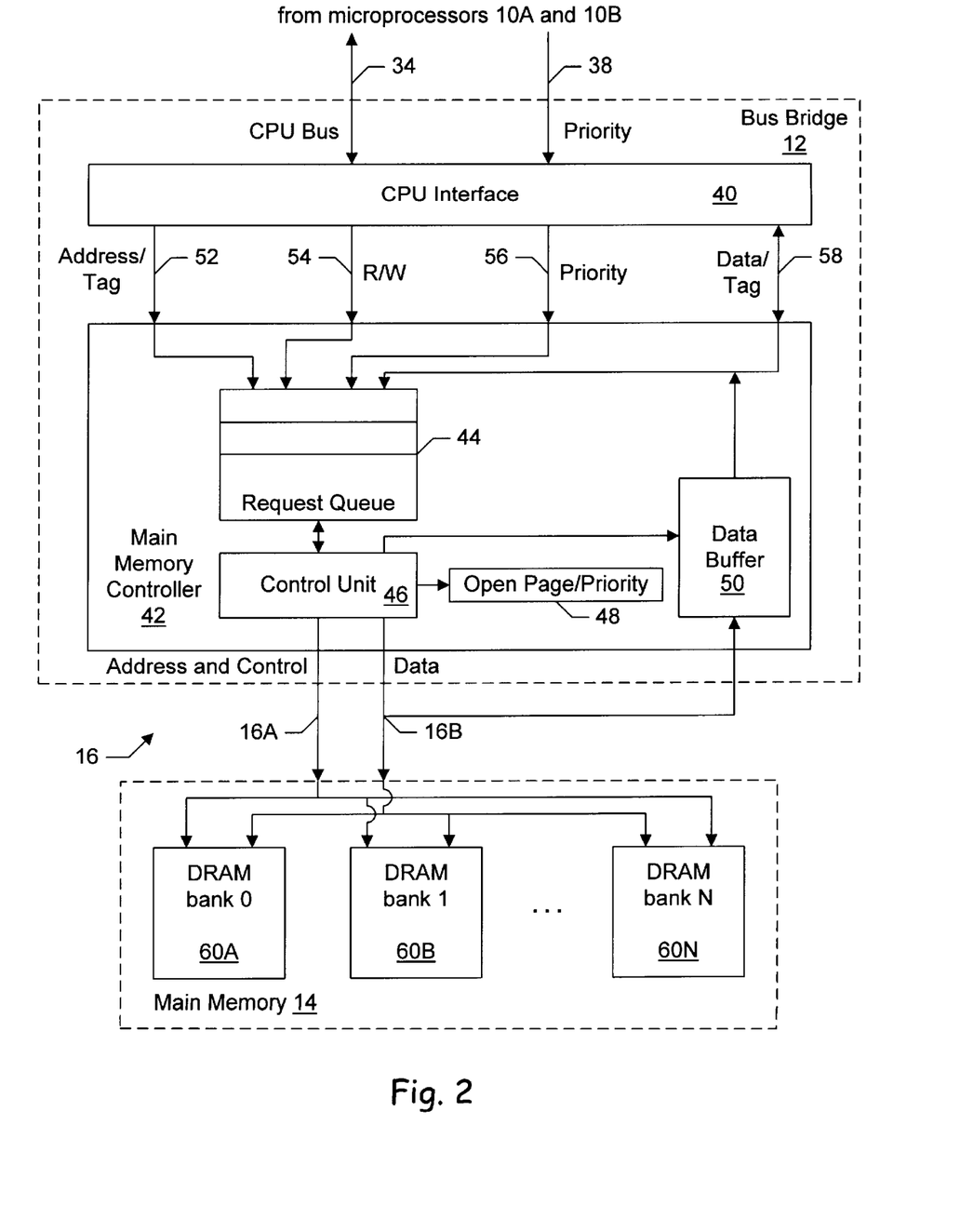
FIG. 2 is a block diagram of one embodiment of a bus bridge shown in FIG. 1.

Turning now to FIG. 2, a block diagram of one embodiment of bus bridge 12 and main memory 14 is shown in greater detail. Other embodiments are possible and contemplated. Only portions of bus bridge 12 pertaining to the present disclosure are shown in FIG. 2. Other portions may be implemented as desired. As shown in FIG. 2, bus bridge 12 includes a CPU interface block 40 and a main memory controller 42. Main memory controller 42 may include a request queue 44, a control unit 46, an open page/priority storage 48, and a data buffer 50. CPU interface block 40 is coupled to CPU bus 34 and priority line 38. Additionally, CPU interface block 40 is coupled to main memory controller 42 via an address/tag bus 52, a R/W line 54, a priority line 56, and a data/tag bus 58. Each of address/tag bus 52, R/W line 54, priority line 56, and data/tag bus 58 are coupled to request queue 44, and data/tag bus 58 is coupled to data buffer 50. Request queue 44, data buffer 50, and open page/priority storage 48 are coupled to control unit 46. Additionally, control unit 46 is coupled to an address and control bus 16A and a data bus 16B which comprise memory bus 16. Data buffer 50 is also coupled to data bus 16B. Main memory 14 comprises a plurality of DRAM banks 60A–60N. Each DRAM bank 60A–60N comprises one or more DRAMs, and each DRAM bank 60A–60N is coupled to memory bus 16. The DRAMs included in main memory 14 may comprise any type of DRAM, including standard asynchronous DRAM, SDRAM, etc.

CPU interface block 40 is configured to receive bus operations from microprocessors 10A and 10B upon CPU bus 34, and to initiate bus operations upon CPU bus 34 in response to operations received from other devices attached thereto (e.g. coherency operations in response to memory accessed performed by other devices, etc.). If CPU interface block 40 receives a memory operation upon CPU bus 34, CPU interface block 40 routes the address of the memory operation and the corresponding tag from CPU bus 34 upon address/tag bus 52 to main memory controller 42. Additionally, the read/write nature of the memory operation is conveyed via read/write line 54 and the corresponding priority (received upon priority line 38) is conveyed upon priority line 56. If the memory operation is a write memory operation, the corresponding data is conveyed via data/tag bus 58.

Request queue 44 stores the information provided by CPU interface block 40. If request queue 44 is empty prior to receipt of a memory operation and main memory 14 is idle, the memory operation may be selected by control unit 46 for presentation to main memory 14. Additionally, if a memory operation is in-progress to main memory 14, the memory operation being received is to the same page as the in-progress memory operation, and the priority level assigned to the memory operation is higher than the priority level of the in-progress memory operation, control unit 46 is configured to interrupt the in-progress memory operation to perform the memory operation. After completing the memory operation, control unit 46 may resume the in-progress memory operation.

Generally, control unit 46 may select memory operations from request queue 44 in order. However, a higher priority memory operation (as indicated via the priority assigned to the memory operation by the master for the memory operation) may be selected over a prior, lower priority memory operation (if the lower priority memory operation is to a different address than the higher priority memory operation). Control unit 46 conveys the address of the selected memory operation to main memory 14 along with corresponding control information via address and control bus 16A. In the present embodiment, the control information includes a write enable line to indicate that the operation is a read or write, a row address strobe (RAS_) line to indicate that the row portion of the address is being conveyed, and a column address strobe (CAS_) line to indicate that the column address is being conveyed. Other control lines may be included as well (for example, bank select lines for selecting which bank or banks is to respond to an access, etc.). The row portion of the address is conveyed first, along with an activation of the RAS_line. Subsequently, the column portion of the address is conveyed along with an activation of the CAS_line. If the operation is a read, the selected data is provided by main memory 14 upon data bus 16B. Data buffer 50 may capture the data from the data bus under the direction of control unit 46. If the operation is a write, the write data is driven by control unit 46 upon data bus 16B.

Typically, multiple beats are performed to complete a memory operation (e.g. to read or write a cache line of data). The page mode feature of the DRAMs forming DRAM banks 60A–60N is typically used to transfer the data. In other words, subsequent beats are performed by presenting the corresponding column addresses (utilizing the same row) and transferring the data. Certain types of SDRAMs may be configured to burst data from a particular set of columns in response to a particular column address over a number of cycles, such that the beats are provided in response to a single row and column address. Such SDRAMs may support an interruption command to allow the bursts to be interrupted, and the command may be used by control unit 46 when such interruption is desired to perform a higher priority memory operation.

Control unit 46 records the page (e.g. the row portion of the address) and the priority level of the in-progress memory operation in open page/priority storage 48. If a higher priority memory operation is detected (by comparing the priority level stored in open page/priority storage 48 to the priority level of incoming memory operations), and if the incoming memory operation is to the same page as the in-progress memory operation (detected by comparing the page recorded in open page/priority storage 48), then the in-progress data transfer may be interrupted to perform the higher priority memory operation. The column portion of the address of the higher priority memory operation is presented, and the corresponding data transferred. Subsequently, the lower priority (formerly in-progress) memory operation is completed by presenting the column portion of the address corresponding to the next data to be transferred, and by transferring the remaining data.

In one embodiment, DRAM banks 60A–60N may be accessed independently to allow multiple memory operations to be performed between main memory 14 and main memory controller 42. For such an embodiment, multiple open pages and corresponding priority levels may be stored in open page/priority storage 48.

Data buffer 50 may assemble the data from main memory 14 for read memory operations. Once the data has been assembled, the data is transferred to CPU interface 40 along with the corresponding tag presented when the read memory operation was transferred to main memory controller 42. CPU interface block 40 returns the data upon CPU bus 34, using the tag to identify the data thereon.

It is noted that request queue 44 may be implemented as separate read and write queues, as desired. Alternatively, data buffer 50 may buffer both write data for subsequent conveyance upon data bus 16B and read data for subsequent conveyance on CPU bus 34. It is noted that data buffer 50 and/or request queue 44 may be eliminated in various embodiments in favor of queuing in CPU interface block 40. It is still further noted that, if a lower priority write operation is interruptible in a given embodiment, the lower priority operation may not be interrupted if the higher priority memory operation overlaps with the lower priority memory operation.

Figure 3:
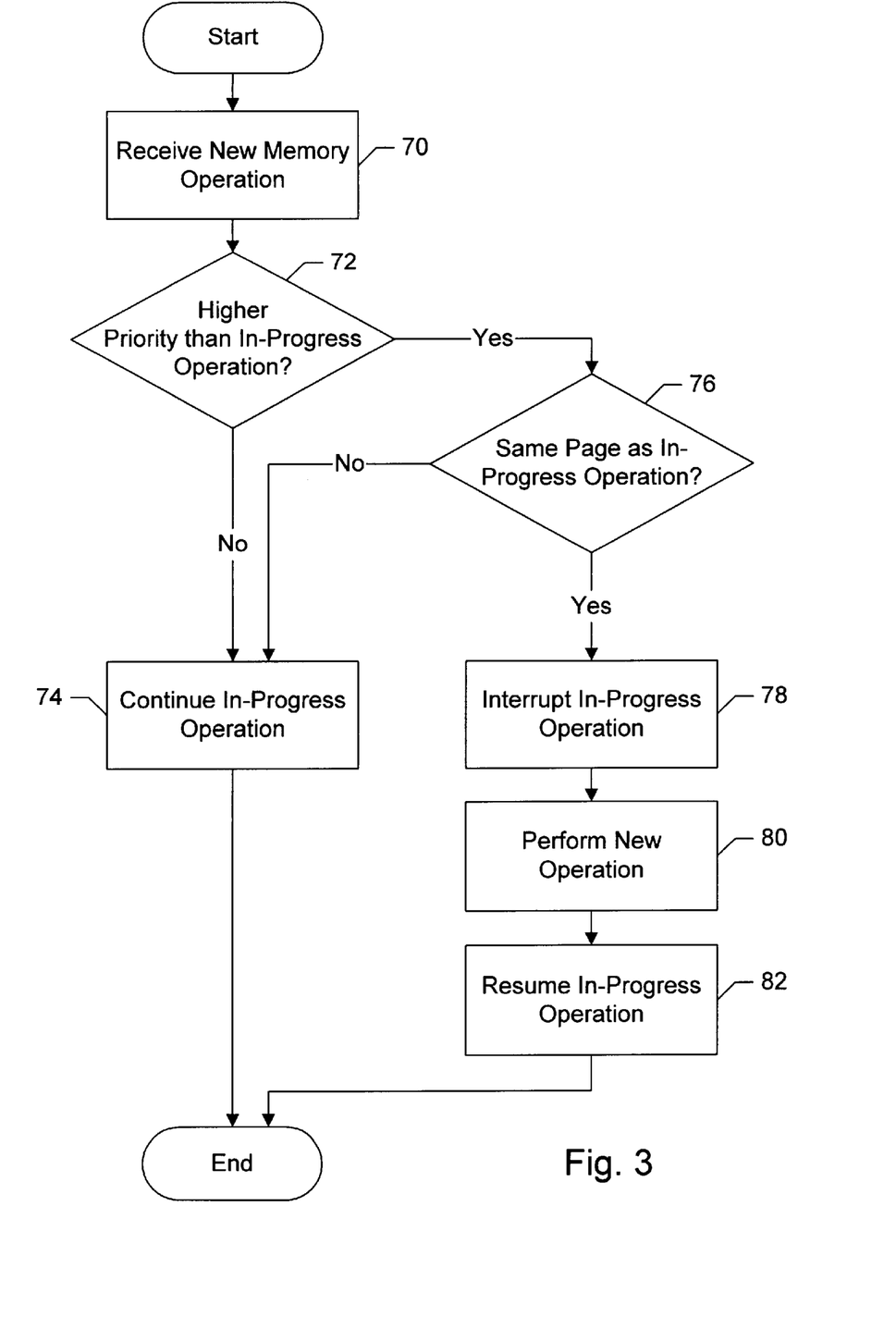
FIG. 3 is a flowchart illustrating operation of one embodiment of the bus bridge shown in FIGS. 1 and 2 upon receiving a memory operation.

Turning next to FIG. 3, a flowchart is shown illustrating certain operations of one embodiment of bus bridge 12 upon receiving a memory operation. Other embodiments are possible and contemplated. As illustrated at step 70, the memory operation is received. The memory operation is termed "new memory operation" to distinguish it from the in-progress memory operation within the flowchart of FIG. 3.

Bus bridge 12 determines if the new memory operation is higher priority than the in-progress memory operation (decision block 72). If the new memory operation is the same or lower priority, then the in-progress memory operation continues (step 74). The new memory operation is queued for subsequent presentation to main memory 14.

On the other hand, if the new memory operation is higher priority than the in-progress memory operation, bus bridge 12 determines if the new memory operation is in the same page as the in-progress memory operation (decision block 76). If the new memory operation is in a different page, the in-progress memory operation continues (step 74). The new memory operation is queued for subsequent presentation to main memory 14.

Conversely, if the new memory operation is to the same page as the in-progress memory operation, the in-progress memory operation is interrupted (step 78). The new memory operation is then presented to main memory 14 and completed (step 80), and the in-progress memory operation is resumed at the point of interruption (step 82).

It is noted that, in another embodiment, another factor which may be considered in determining if the in-progress memory operation is interrupted is the type of memory operation (read/write). If the new memory operation is a different type than the in-progress operation, then it may be desirable not to interrupt the in-progress operation. A certain amount of time to disable and enable the driving of data bus 16B by main memory 14 and bus bridge 12 may be needed in the case of different types. It is further noted that, although the steps in the flowchart of FIG. 3 are shown serially in a particular order for ease of understanding, any order which achieves a similar result may be used. Furthermore, many of the steps may be performed in parallel in the combinatorial logic forming bus bridge 12.

Figure 4:
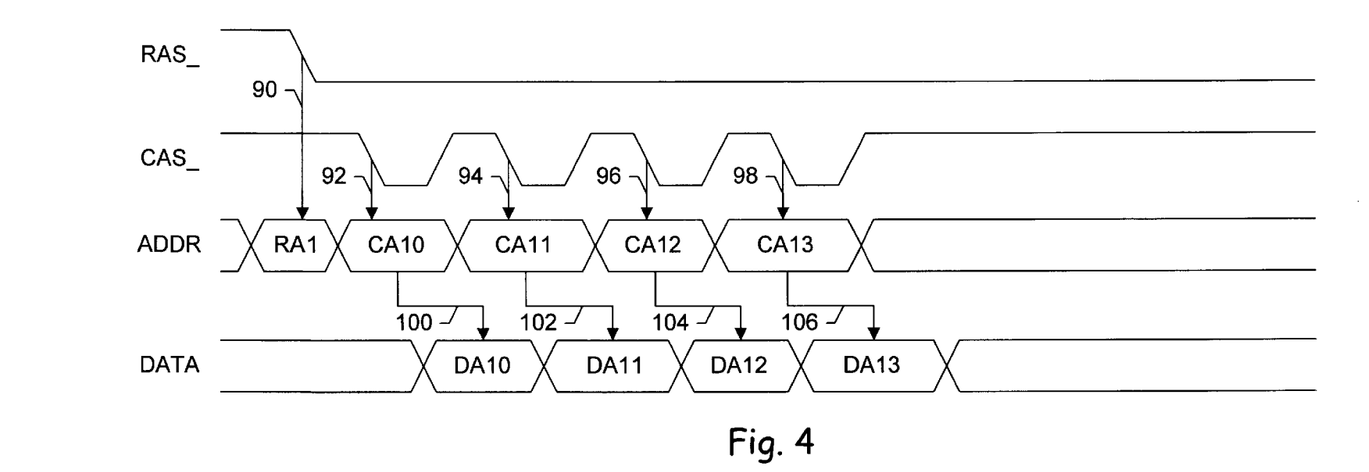
FIG. 4 is a timing diagram illustrating operation of certain signals upon an interface between the bus bridge shown in FIGS. 1 and 2 and the main memory shown in FIG. 1, according to one embodiment of the bus bridge and the main memory, for a memory operation.

Turning next to FIG. 4, a timing diagram illustrating operation of certain signals included in address and control bus 16A and data bus 16B in one embodiment of computer system 5 for a read memory operation is shown. Other embodiments are possible and contemplated. The embodiment shown in FIG. 4 corresponds to standard asynchronous DRAMs.

A RAS_signal and a CAS_signal are illustrated in FIG. 4. To begin a memory operation upon memory bus 16, the RAS_signal is activated (driven to a logical low value). Upon activation of the RAS_signal, the DRAM(s) capture the row address (illustrated as RA1 on the address lines ADDR in FIG. 4). In FIG. 4, the correlation between activation of the RAS_signal and the capture of the row address is illustrated by arrow 90.

Subsequently, the column address for the first beat of data is provided. The DRAM(s) capture the column address for the first beat of data (illustrated as CA10 on the address lines ADDR in FIG. 4) upon activation of the CAS_signal. The correlation between activation of the CAS_signal and the capture of the column address is illustrated via arrow 92. Similarly, subsequent beats are accessed by providing additional column addresses CA11, CA12, and CA13 upon subsequent activations of the CAS_signal (the correlation of which is shown by arrows 94, 96, and 98).

Data corresponding to each column address is returned (the correlation to column addresses is indicated by arrows 100, 102, 104, and 106. Hence data DA10, DA11, DA12, and DA13 is returned corresponding to column addresses CA10, CA11, CA12, and CA13, respectively. After data DA13 corresponding to column address CA13 is received, the memory operation is complete in the present example.

Figure 5:
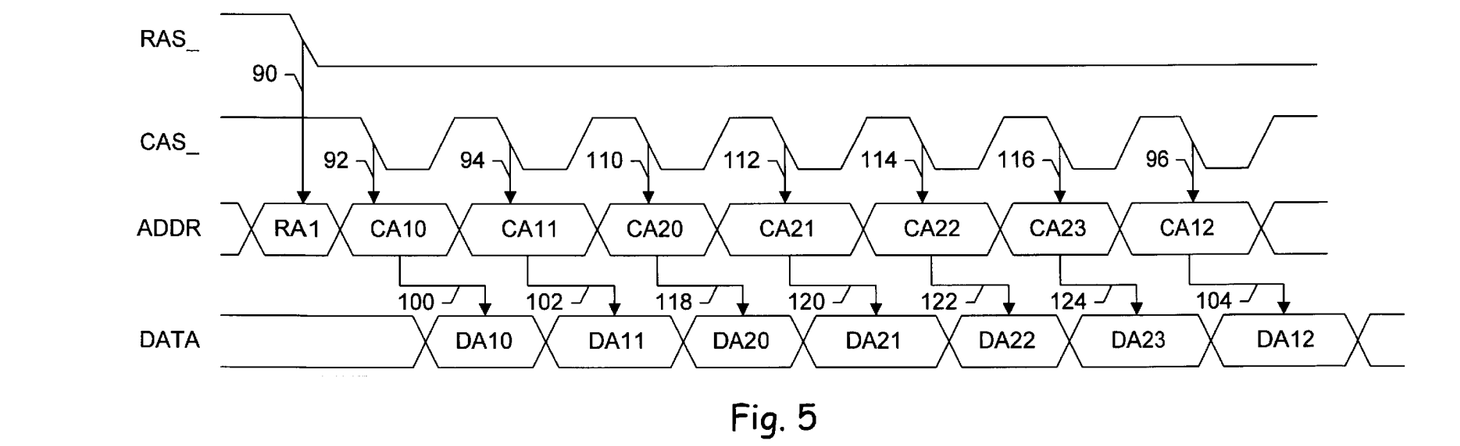
FIG. 5 is a timing diagram illustrating operation of certain signals upon the interface between the bus bridge shown in FIGS. 1 and 2 and the main memory shown in FIG. 1, according to one embodiment of the bus bridge and the main memory, for a first memory operation interrupted by a second memory operation.

FIG. 5 is a timing diagram illustrating operation of certain signals included in address and control bus 16A and data bus 16B in one embodiment of computer system 5 for a first read memory operation interrupted by a second, higher priority read memory operation. Other embodiments are possible and contemplated. The embodiment shown in FIG. 5 corresponds to standard asynchronous DRAMs.

Similar to FIG. 4, a row address RA1 corresponding to the first read memory operation is provided upon activation of the RAS_signal (the correlation to which is indicated by arrow 90). Subsequently, column addresses CA10 and CA11 are presented on consecutive assertions of the CAS_signal (the correlation of which is indicated by arrows 92 and 94). Corresponding data DA10 and DA11 is returned corresponding to CA10 and CA11, as indicated by arrows 100 and 102.

However, the second memory operation is received and is determined to be to the same page as the first memory operation and is determined to be higher priority than the first memory operation. Accordingly, the first memory operation is interrupted. The next column address to be presented (upon the next assertion of the CAS_signal, the correlation of which is shown by arrow 110) after CA11 is CA20, the first column address for the second memory operation. At subsequent assertions of the CAS_signal, the remaining column addresses for the second memory operation are provided (CA21, CA22, and CA23 indicated by arrows 112, 114, and 116). Since the first and second memory operation are within the same page, it is sufficient to provide the column addresses for the second memory operation to retrieve data for the second memory operation.

Accordingly, data corresponding to column addresses CA20, CA21, CA22, and CA23 is provided (DA20, DA21, DA22, and DA23, respectively, the correlation of which is indicated by arrows 118, 120, 122 and 124). The transfer of the second memory operation is complete upon return of data DA23 in the present example. Subsequently, the data transfer for the first memory operation is resumed by presenting the column address CA12 upon the next assertion of the CAS_signal (the correlation of which is indicated by arrow 96). Data corresponding to the column address CA12 is accordingly returned (data DA12, the correlation to address CA12 being indicated by arrow 104). Column address CA13 is presented (not shown) to complete the data transfer for the first memory operation.

In accordance with the above disclosure, a computer system has been shown in which a priority level is assigned to each memory operation by the initiator of the memory operation. A low priority level is assigned to prefetch memory operations, while fetch memory operations receive a high priority level. If a prefetch memory operation is in-progress and a fetch memory operation to the same page as the prefetch memory operation is detected, then the prefetch memory operation is interrupted to perform the fetch memory operation. The latency of the fetch memory operation may not be adversely affected by the existence of the prefetch memory operation. Overall performance of the computer system may thereby be increased.

Numerous variations and modifications will become apparent to those skilled in the art once the above disclosure is fully appreciated. It is intended that the following claims be interpreted to embrace all such variations and modifications.

What is claimed is:

1. A method for transferring data in a computer system, comprising:

initiating a first memory operation having a first priority;

initiating a second memory operation having a second priority subsequent to said initiating said first memory operation;

transferring data corresponding to said first memory operation; and interrupting said transferring if said second priority is higher than said first priority, and transferring data corresponding to said second memory operation during said interrupting, wherein said interrupting is inhibited if a first memory address corresponding to said first memory operation is in a different page than a second memory address corresponding to said second memory operation.

2. The method as recited in claim 1 further comprising transferring a remaining portion of said data corresponding to said first memory operation subsequent to said interrupting.

3. The method as recited in claim 1 wherein said transferring data corresponding to said first memory operation and said transferring data corresponding to said second memory operation are performed between a main memory and a bus bridge within said computer system.

4. The method as recited in claim 1 wherein said initiating said first memory operation and said initiating said second memory operation are performed by a microprocessor.

5. The method as recited in claim 4 wherein said microprocessor is configured to generate prefetch memory operations.

6. The method as recited in claim 5 wherein said first priority is a prefetch priority.

7. The method as recited in claim 6 wherein said second priority is a fetch priority.

8. The method as recited in claim 7 wherein said fetch priority is higher than said prefetch priority, wherein a prefetch memory operation is interruptible by a fetch memory operation.

9. A computer system comprising:

at least one microprocessor, wherein said microprocessor is configured to initiate a first memory operation and to subsequently initiate a second memory operation, and wherein said microprocessor is configured to assign a first priority to said first memory operation responsive to a first type of said first memory operation, and wherein said microprocessor is configured to assign a second priority to said second memory operation responsive to a second type of said second memory operation;

a main memory configured to store data including a first data corresponding to said first memory operation and a second data corresponding to said second memory operation; and a bus bridge coupled between said microprocessor and said main memory, wherein said bus bridge is configured to initiate transfer of said first data from said main memory to said microprocessor responsive to said first memory operation, and wherein said bus bridge is configured to interrupt transfer of said first data upon receiving said second memory operation if said second priority is higher than said first priority, and wherein said bus bridge is configured to inhibit interruption of transferring said first data if said first memory operation and said second memory operation are in different pages of said main memory.

10. The computer system as recited in claim 9 wherein said bus bridge is configured to transfer said second data while transfer of said first data is interrupted.

11. The computer system as recited in claim 10 wherein said bus bridge is configured to resume transferring said first data upon completing transfer of said second data.

12. The computer system as recited in claim 9 wherein said microprocessor is configured to assign each of said first priority and said second priority to one of at least two priority levels.

13. The computer system as recited in claim 12 wherein said at least two priority levels includes a prefetch priority level and a fetch priority level.

14. The computer system as recited in claim 13 wherein said fetch priority level is higher than said prefetch priority level.

15. The computer system as recited in claim 9 wherein said bus bridge is configured to interrupt a transfer of said first data between said main memory and said bus bridge.

16. A bus bridge for a computer system, comprising:

a CPU interface block coupled to receive bus operations from a microprocessor, wherein said bus operations include memory operations, and wherein each memory operation includes a priority assigned by an initiator of said memory operation; and a memory controller coupled to said CPU interface block and a memory, wherein said memory controller is configured to receive said each memory operation and said priority from said CPU interface block, and wherein said memory controller is configured to interrupt an in-progress memory operation to service a subsequent memory operation if a first priority corresponding to said in-progress memory operation is lower than a second priority corresponding to said subsequent memory operation, and wherein said memory controller is configured to inhibit interrupt of said in-progress memory operation if said in-progress memory operation is to a different page of said memory than said subsequent memory operation.

17. The bus bridge as recited in claim 16 wherein said memory controller is configured to resume said in-progress memory operation after servicing said subsequent memory operation.

* * * * *